Apr. 10, 1923.                                                          1,451,143
                              J. H. CLARK
        DEMOUNTABLE HARD RUBBER CUSHIONED TIRE AND RIM
                            Filed May 9, 1921
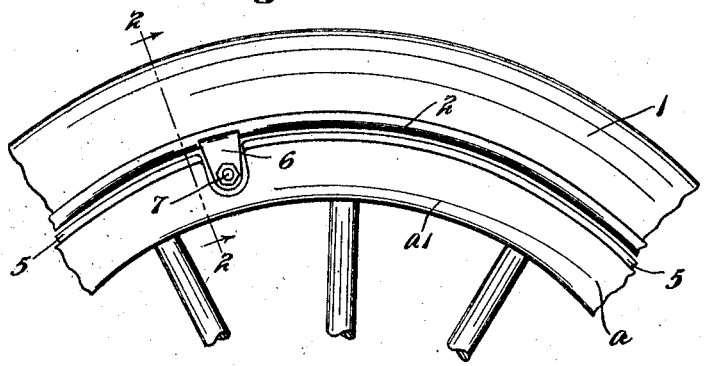
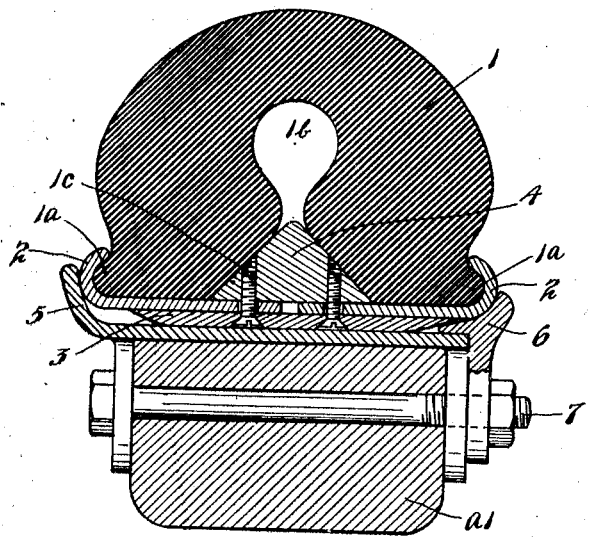
INVENTOR.
JAMES H. CLARK.
BY HIS ATTORNEY Patented Apr. 10, 1923.

1,451,143

UNITED STATES PATENT OFFICE.

JAMES H. CLARK, OF PORTAGE, WISCONSIN, ASSIGNOR OF ONE-HALF TO J. M. RUSSELL, OF PORTLAND, OREGON.

DEMOUNTABLE HARD-RUBBER CUSHIONED TIRE AND RIM.

Application filed May 9, 1921. Serial No. 467,859.

*To all whom it may concern:*

Be it known that I, JAMES H. CLARK, a citizen of the United States, residing at Portage, in the county of Columbia and State of Wisconsin, have invented certain new and useful Improvements in Demountable Hard-Rubber Cushioned Tires and Rims; and I do hereby declare the following to be a full, clear, and exact description of the invention, such as will enable others skilled in the art to which it appertains to make and use the same.

This invention relates to a tire and rim structure, and particularly to a rim structure which is demountable and adapted to hold a cushion tire.

It is an object of this invention to provide a construction by means of which a cushion tire can be readily taken from or secured on the rim and will be securely held in place thereon.

It is another object of the invention to provide such a structure which can be used with a tire having a cored channel formed therein of any desired size.

It is still another object of the invention to provide means which normally bears on the innerside of the tire and expands the same to hold the tire in secure position on the rim structure. These and other objects and advantages will more fully appear from the following description made in connection with the accompanying drawings in which like reference characters refer to the same parts throughout the different views; and in which—

Fig. 1 is a side elevation of a section of a wheel showing the invention as applied thereto; and Fig. 2 is a radial section of such a wheel, taken on the line 2—2 of Fig. 1, looking in the direction of the arrows.

Referring to the drawings, a wheel of the ordinary automobile type is designated as $a$ comprising the felloe $a^1$. The improved structure comprises the tire 1 formed at each side with projecting beads $1^a$. The tire 1 is of the solid cushion type and is designed to have a central longitudinal opening or cored channel $1^b$. A contracted opening extends from the channel $1^b$ to the inside of the tire, which opening adjacent to the innerside of the tire is formed with straight surfaces slightly inclined outwardly toward the sides of the tire. The tire 1 is held primarily in the rim sections 2, which extend around the wheel and are provided at their outer edges with external portions adapted to extend around and embrace the beads $1^a$. At the innerside of the members 2 is another plate 3 also extending around the wheel. The tire 1 is expanded so that the beads $1^a$ are forced firmly into the members 2 by a wedge-shaped member having its base in contact with the members 2 and extending around the wheel. This member is held in position by spaced fastening means shown as headed screws which pass through the plate 3 and the plates 2 into tapped holes in the said member, the heads of the screws being countersunk in the plate 3. The plates 2 and 3 are held on the wheel by the usual rim 5 and clamps 6 which are drawn together to clamp the said parts firmly in position by the headed and nutted bolts 7 passing through the felloe and through lugs extending from the members 5 and 6.

With the structure described it will be noted that the tire is formed so that the surfaces $1^c$ of the opening at the innerside thereof bear against the sides of the wedge member 4 and thus act consistently to expand the tire and hold the same firmly in the members 2. The tire can be quickly removed and the rim demounted by loosening the clamping members 6 and removing the same and sliding the plate 3 laterally from the wheel 1. One of the series of screws holding member 4 can then be removed and one of the plates 2 taken off. The tire can then be readily removed from the wheel. It will be obvious that a tire can be quickly mounted on the rim and the rim on the wheel by performing the operations described in reverse order, the tire being first placed in one of the members 2 and the member 4 held by one of the attaching screws.

With this structure, a cushion tire can have the central channel cored therein of any desired size. It is well known to those skilled in the art that most of the cushion tires are molded directly into a rigid rim, but by the structure herein disclosed the tire can be made separate and afterwards readily mounted upon the rim structure. By providing the central channels of various sizes considerable resiliency is added to the tire. The tires can also be more conveniently and cheaply made. The structure, when assembled, is very compact and comprises few parts which are so put together that it is practically impossible for any of the parts to become loose or disarranged.

It will, of course, be understood that various changes may be made in the form, details and arrangement of the device without departing from the scope of applicant's invention, which, generally stated, consists in the matter shown and described and set forth in the appended claims.

What is claimed is:

1. A cushion tire structure having in combination, a tire having a central longitudinal channel extending therethrough, said tire being divided along a plane extending therefrom to the inside of the tire centrally thereof, a wedge-shaped expanding member disposed between said divisions, a rim comprising two circumferentially extending sections, each disposed under the tire and formed to embrace the tire at one side thereof, and securing means for said sections and the expanding member.

2. A device of the class described having in combination, a solid tire having a central opening formed therein and having a contracted portion extending to the inside thereof, an expanding member adapted to contact with the sides of said portion, a rim comprising two laterally separable sections extending circumferentially about the tire and having inturned portions into which the tire is forced by the expanding member, a plate extending about the rim and located beneath said sections, and fastening means passing through said plate and said sections into the expanding member.

3. A tire structure comprising a solid tire having a central longitudinal channel and an opening extending therefrom to the inside of the tire, a rim member comprising two laterally separable sections, each formed to embrace a portion of the tire at the sides thereof, a wedge shaped member disposed in said opening in the tire with its sides in contact with the sides of said opening and acting to force the tire into engagement with said rim section, a plate extension around said rim sections inside of the same, and securing means passing through said plate in said sections and securing the wedge-shaped member thereto.

In testimony whereof I affix my signature in presence of two witnesses.

JAMES H. CLARK.

Witnesses:
E. S. BAKER,
A. SCHLOEMILCH.